United States Patent [19]
Marron et al.

[11] Patent Number: 5,907,404
[45] Date of Patent: May 25, 1999

[54] MULTIPLE WAVELENGTH IMAGE PLANE INTERFEROMETRY

[75] Inventors: Joseph C. Marron, Ann Arbor; Kurt W. Gleichman, Saline, both of Mich.

[73] Assignee: ERIM International, Inc., Ann Arbor, Mich.

[21] Appl. No.: 08/925,381

[22] Filed: Sep. 8, 1997

[51] Int. Cl.⁶ .................................................. G01B 9/02
[52] U.S. Cl. .......................................................... 356/360
[58] Field of Search .................................... 356/359, 360, 356/357

[56] References Cited

U.S. PATENT DOCUMENTS

| | | | |
|---|---|---|---|
| 3,998,553 | 12/1976 | Hunter et al. | 356/359 |
| 4,725,144 | 2/1988 | Nelson et al. | 356/360 |
| 4,832,489 | 5/1989 | Wyant et al. . | |
| 4,872,756 | 10/1989 | Hill | 356/360 |
| 4,955,719 | 9/1990 | Hayes | 356/359 |
| 5,042,949 | 8/1991 | Greenberg et al. | 356/359 |
| 5,398,113 | 3/1995 | de Groot . | |
| 5,583,632 | 12/1996 | Haga | 356/359 |
| 5,706,085 | 1/1998 | Blossey et al. | 356/360 |
| 5,739,906 | 4/1998 | Evan et al. | 356/360 |

OTHER PUBLICATIONS

"Three–dimensional lensless imaging using laser frequency diversity", Applied Optics, Jan.10,1992, vol. 31, No. 2.
"Laser Speckle and Related Phenomena", Topics in Applied Physics, vol. 9.
"Three–dimensional, fine–resolution imaging using laser frequency diversity", Optical Society of America, J. Marron & T. Schulz, © 1992.

*Primary Examiner*—Samuel A. Turner
*Attorney, Agent, or Firm*—Brooks & Kushman P.C.

[57] ABSTRACT

A system for interferometric inspection of an object includes a number of improvements to reduce spurious reflections and provide precision measurement of large objects. A neutral density filter of absorptive glass is used as an attenuator to reduce undesirable reflections which may otherwise result in detector saturation. A wedge-shaped beam splitter having at least one anti-reflective surface is also utilized to reduce unwanted reflections. The system uses multiple wavelength interferometry to provide range information for an object. Additional improvements in precision may be provided by using a wavelength calibration device such as an etalon, a wavemeter, or a reference cell having relatively narrow transmission peaks, to improve the accuracy in determining the laser wavelengths. The wavelength information may be used to more precisely determine range values for the object. The various improvements in precision and accuracy facilitate use of differing optical path lengths for the reference beam and object beam so that overall system size and complexity is reduced.

40 Claims, 9 Drawing Sheets

MULTIPLE WAVELENGTH IMAGE PLANE INTERFEROMETRY

CROSS-REFERENCE TO RELATED APPLICATION

The present invention is related to copending and commonly assigned U.S. Pat. App. Ser. No. 08/925,377, entitled "Method And Apparatus For Three-Dimensional Imaging Using Laser Illumination Interferometry" filed Sep. 8, 1997, the disclosure of which is hereby incorporated by reference in its entirety.

1. Technical Field

The present invention relates to systems and methods for inspection using multiple wavelength image plane interferometry.

2. Background Art

Two-wavelength interferometry has been used in three-dimensional inspection systems and methods such as those disclosed in U.S. Pat. No. 4,832,489 to Wyant et al. The method operates by recording interferometric data at two laser wavelengths and determining the range based on the difference between phase values for each frequency at each point. The difference in the phase values yields a direct determination of the object height. This method is generally applied to specularly reflecting objects, such as optical components, which produce interferometric images with distinct fringes as compared to diffuse objects which produce speckled images that effectively have fine, random fringes.

Systems and methods for three-dimensional imaging have been developed using multiple wavelengths based on theory used for synthetic aperture radar as disclosed in U.S. Pat. No. 5,777,742 hereby incorporated by reference in its entirety. Data is collected at a plurality of phases and multiple wavelengths (or frequencies) for each data point or pixel corresponding to the object of interest in a manner similar to that iris for two-wavelength interferometry. However, the data is processed in a fundamentally different manner using a Fourier transform to determine a range value corresponding to each pixel rather than a direct determination based on the difference in the phase values.

Various system configurations, i.e. selection and placement of elements, were developed based on equal (matched) optical path distances for the object beam and the reference beam to minimize phase error attributable to error in determining the precise wavelengths of the laser source. However, spurious reflections from the optical components in the object and reference beam paths sometimes resulted in erroneous depth measurements attributable to multiple beam paths and/or saturation of the detector pixels.

SUMMARY OF THE INVENTION

It is therefore an object of the present invention to provide a multiple wavelength interferometric inspection system which eliminates spurious reflections which may result in erroneous measurements due to multiple beam paths or detector saturation.

A further object of the present invention is to provide a multiple wavelength interferometric inspection system which does not require matching of the optical path lengths of the reference and object beams.

Another object of the present invention is to provide an inspection system using multiple wavelength interferometry which reduces measurement error attributable to variation in laser wavelengths.

An additional object of the present invention is to provide system configurations capable of precision inspection of interior and exterior portions of cylindraceous parts.

Another object of the present invention is to provide a multiple wavelength interferometric inspection system which automatically adjusts the phase shifts of the reference mirror based on the wavelength of the illumination source.

Yet another object of the present invention is to provide a reflective telecentric optical system for multiple wavelength interferometric inspection to reduce wavelength dependent aberrations and phase errors.

In carrying out the above objects and other objects and features of the present invention, a system for interferometric inspection of an object includes a tunable laser source for providing a coherent energy beam having a selectable variable wavelength. A beam splitter separates the energy beam into a reference beam and an object beam. A reference mirror reflects the reference beam back toward the beam splitter to generate a reflected reference beam, the mirror being positioned generally perpendicular to wavefronts of the reference beam and having an adjustable position in response to a command signal to vary phase of the reflected reference beam. The reference mirror is positioned such that the optical path length of the reference beam differs from the optical path length of the object beam. An attenuator positioned between the mirror and the beam splitter at a non-perpendicular angle relative to the reference beam is used to reduce spurious reflections while attenuating the reference beam. The system also includes an aperture stop having an aperture for establishing a desired speckle size on the detector array, and an optical element for focussing energy reflected from the object to a point within the aperture. An imaging lens focusses the image beam on the detector to facilitate part positioning and reduce processing time by performing a two dimensional Fourier transform. A computer in communication with the tunable laser source, the reference mirror, and the detector, then determines range values for a plurality of points on the object.

The present invention provides a number of advantages over prior art interferometric measurement including two-wavelength interferometry and multiple wavelength interferometry. The use of multiple wavelengths in the present invention provides the ability to measure objects with surface reflectivities which are specular, diffuse, or both due to the large dynamic range provided by distributing energy over a series of measurements. Spatial unwrapping of fringes is not required because the range determination for each pixel is made from information collected only at that pixel. Multiple wavelength interferometry provides improved noise immunity, error tolerance, and dynamic range due to the increased number of measurements for each data point. The present invention provides a monostatic system capable of measuring step discontinuities and regions of varying range (height or depth). The present invention reduces processing time and facilitates part positioning by forming an image of the object on the detector array. System configurations according to the present invention provide a planar wavefront for the object beam which is matched with a planar wavefront of the reference beam to avoid field curvature or tilt. A wavelength calibration device may be provided to improve the precision of the system which depends upon knowledge of the spacing of laser wavelengths during data collection.

The above advantages in addition to other advantages, features, and objects of the present invention will be readily apparent to one of ordinary skill in the art based on the following detailed description of the invention with reference to the accompanying drawings.

DETAILED DESCRIPTION OF THE INVENTION

Figure 1:
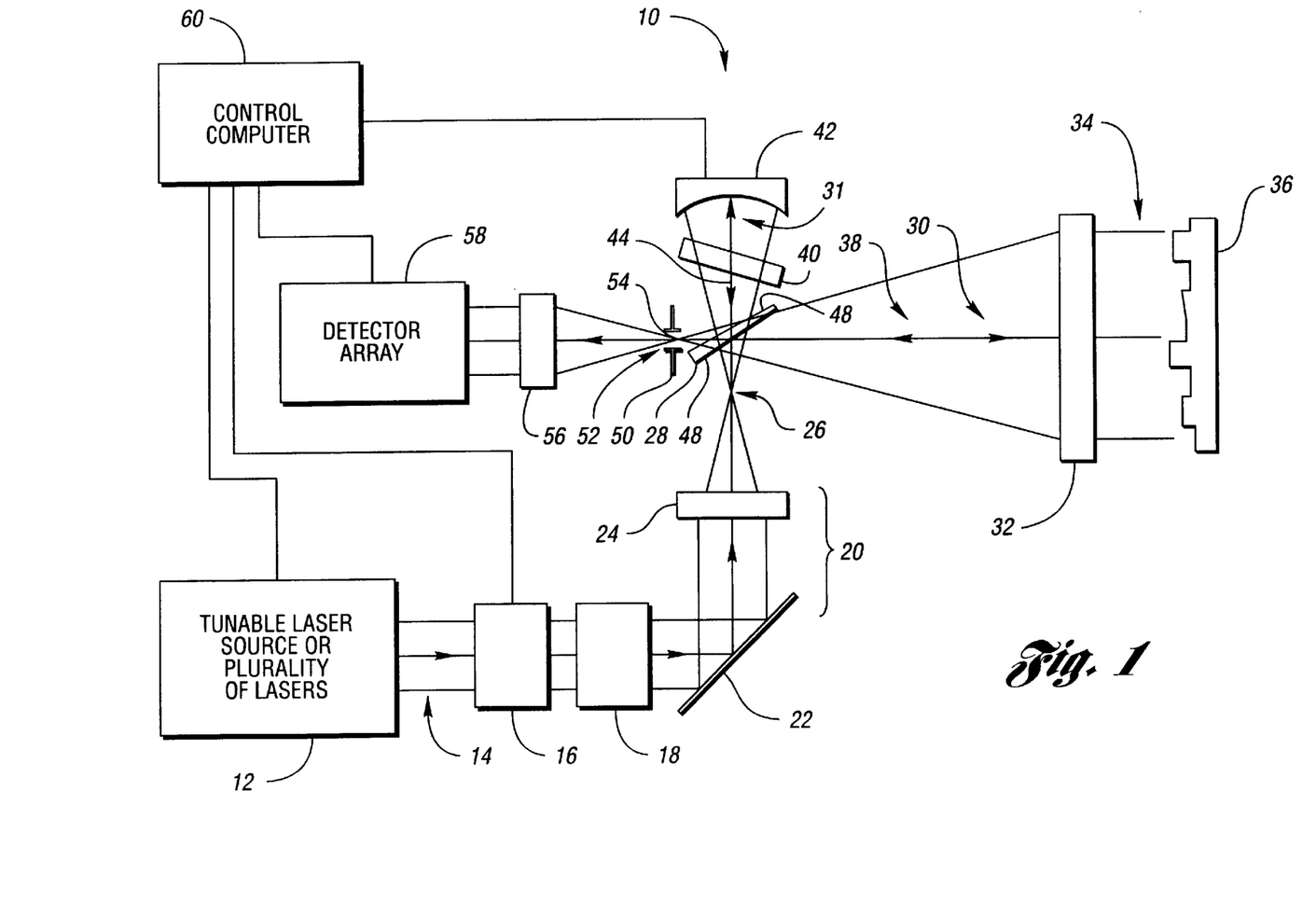
FIG. 1 is a schematic diagram illustrating a system for multiple wavelength interferometry for imaging large objects with reduced spurious reflections according to the present invention.

Referring now to FIG. 1, a system for interferometric inspection of an object is shown, indicated generally by reference numeral 10. A tunable laser source 12 provides a spatially and temporally coherent energy beam, indicated generally by reference numeral 14. Arrows within the various energy beams, such as energy beam 14, generally indicate the direction of propagation or the axis of the beam. Laser 12 includes a power supply and associated electronics to provide coherent energy beam 14 having a variable wavelength (or frequency) selectable in response to a command from a computer 52. In a preferred embodiment, laser source 12 is a tunable diode laser having a bandwidth of about 20 nm tunable within the near infrared (IR) region of about 750 nm to 900 nm and is commercially available from New Focus, Inc. of San Clara, Calif. Other tunable lasers may also be used including various tunable laser diodes, tunable dye lasers, and tunable solid-state lasers such as titanium sapphire and alexandrite. Of course, a plurality of lasers could also be utilized as tunable laser source 12 where each laser has a selected wavelength and is separately activated to collect data for that particular wavelength.

Energy beam 14 passes through an optional wavelength calibration device 16 to determine wavelength of laser source 12 for each selected wavelength. Such a device improves the accuracy and precision of the system by reducing uncertainty in determining the selected wavelengths. Device 16 may include a wavelength reference cell or a system that measures the wavelength of the light and returns a value to computer 52, such as a wavemeter. Reference cells may include gas cells each having predetermined transmission peaks where the transmissivity is significantly greater relative to other wavelengths, or an etalon which has transmission peaks corresponding to selected wavelengths of laser source 12. In the case of an etalon, the laser output can be tuned until the etalon transmission is maximized. An interferometric image is then collected for a plurality of phases at this wavelength. Laser source 12 is then tuned to the next transmission peak of the etalon and an interferometric image is recorded again for each of the phases. This process is repeated until the desired number of wavelengths or interferometric images are recorded. The etalon provides transmission peaks which are regularly spaced and can be adjusted to provide the desired wavelength spacing. In one embodiment of the present invention, 16 wavelengths are used with a spacing of 1 nm for wavelengths from 838 nm to 853 nm. Wavelength calibration device 16 may be eliminated if the tunable laser source can provide precisely spaced wavelengths or where phase correction is performed by computer 52 to obviate the need for precise wavelength control as disclosed in copending and commonly assigned U.S. App. Ser. No. 08/925,377 titled "System And Method For Phase Correction In Multiple Wavelength Interferometers".

Energy beam 14 passes through a beam conditioner or beam conditioning optics 18. The beam conditioning optics may change the shape of energy beam 14 by expanding, focussing, anamorphic correction, or the like. Beam conditioning optics 18 may also include a spatial filter to improve the quality of beam 14, polarizers, or attenuators to control the power of energy beam 14. One or more elements, indicated generally by reference numeral 20, are used to direct energy beam 14 toward a beam splitter 28 and focus energy beam 14 to a point source 26 in front of beam splitter 28. In one embodiment, a planar mirror 22 interposed laser source 12 and beam splitter 28 redirects energy beam 14 while a focussing lens 24 focuses energy beam 14 to first point source 26. In one embodiment, lens 24 is a 40X or 60X microscope objective. Alternatively, a 3.1 mm laser diode (LD) lens may be used which is available from Thor Labs of Newton New Jersey. Alternatively, a single 45 degree off-axis parabolic mirror is positioned between tunable laser source 12 and beam splitter 28 to direct and focus energy beam 14 to a point between the parabolic mirror and beam splitter 28. Off-axis parabolic mirrors are commercially available from various optical component suppliers, such as Janos Technologies of Townsbend, Vermont and DOSC of Morrilton, Ark.

Beamsplitter 28 divides or separates energy beam 14 into an object beam 30 and a reference beam 31. Preferably, beamsplitter 28 is a wedge-shaped beam splitter having a wedge angle between a first surface 46 and a second surface 48 so that any reflections from second surface 48 are blocked by aperture stop element 50. In a preferred embodiment, the wedge angle of beam splitter 28 is about 1°. Second surface 48 is preferably coated with an anti-reflective material to further reduce undesirable reflections. Such beam splitters are commercially available and may be purchased from Opto Sigma of Santa Ana, Calif., for example. Beamsplitter 28 is preferably positioned at a nominal 45° angle relative to the propagation direction or beam axis of energy beam 14.

Object beam 30 is collimated by a collimator 32 to form a beam with substantially planar wavefronts which illuminates an object space 34 and a representative object 36 which may be either specularly or diffusively reflective, or a combination thereof. Specular objects produce interferometric images with distinct fringes whereas diffuse objects produce speckled images that effectively have fine, random fringes. Collimator 32 may be reflective, such as a concave mirror, or refractive, such as a lens. In a preferred embodiment, collimator 32 is a reflective collimator to provide imaging of large objects while eliminating spurious reflections. Preferably an off-axis parabolic mirror having its focal point at point source 26 is utilized. If object 36 is a plane mirror oriented perpendicularly to the object beam 30, collimator 32 produces a conjugate to the original focus point 26 at the center 54 of aperture stop 50. In this manner, the wavefronts from object beam 38 and reference beam 44 are matched, except for aberrations introduced by propagation through the angled or tilted glass elements. Aberrations common to both object beam 38 and reference beam 44 are cancelled through the interference process. Energy reflected from object 36 is collected by collimator 32 and directed back toward beam splitter 28 as indicated generally by reference numeral 38.

Reference beam 31 passes through an attenuator 40 positioned between beamsplitter 28 and a reference mirror 42 which forms reflected reference beam 44. Attenuator 40 is preferably positioned at a nonperpendicular angle of between 10° and 20° relative to the reference beam to reduce spurious reflections while providing selective attenuation of the reference beam. The angle is adjusted so that spurious reflections do not pass through to the image plane. As illustrated in FIG. 1, the converging or diverging reference beam passes through various optical components at angles relative to the direction of propagation. These components introduce aberrations into the reference beam. To partially compensate for (reduce) spherical aberration, attenuator 40 is preferably positioned at an angle opposite in direction from that of beamsplitter 28 relative to a plane perpendicular to the direction of propagation. While this may not totally eliminate the aberration, the residual aberration has not been problematic. The amount of aberration may be further reduced by minimizing thickness of the components encountered by the reference beam and/or compensating aberrations in the object beam.

Attenuator 40 is preferably a neutral density filter made of absorptive glass for the selected illumination wavelengths. The absorptive glass neutral density filter has been found to further reduce spurious reflections as compared to other types of neutral density filters, such as those based on absorptive metal coatings applied to glass. Several neutral density filters may be mounted in a filter wheel to provide selective attenuation of the reference beam by selecting a particular one of the filters for placement in the optical path.

With continuing reference to FIG. 1, reference mirror 42 is positioned generally perpendicular to wavefronts of reference beam 44 and has an adjustable position in response to a command signal from computer 60 to vary the phase of reflected reference beam 44 relative to object beam 30. Reference mirror 42 is slightly translated along the axis of reference beam 44 to accomplish in-phase and quadrature detection to determine the complex values of the interference pattern. This is accomplished by moving the reference mirror longitudinally to shift the relative phase between the object and reference beams. Relative phase changes of 0, $\pi/2$, $\pi$, and $3\pi/2$ are preferably used. However, it is also possible to accomplish the measurement with phase shifts of 0, $2\pi/3$, and $4\pi/3$. The required range of motion to accomplish these phase shifts is on the order of the wavelength of the light. For example, to impart a $\pi/2$ phase shift, reference mirror 42 is translated by a distance of the wavelength divided by four (or 5*wavelength/4, etc.). A complicating factor in multiple wavelength interferometry is that the size of the translation steps is dependent upon the wavelength of light which varies during a particular measurement. As such, the present invention provides appropriate translations of reference mirror 42 to impart the required phase shifts using signals generated by computer 60. The signal from computer 60 is adjusted to apply the wavelength compensated phase shift using reference mirror 42 which is preferably mounted to a piezoelectric transducer (PZT).

In one embodiment, reference mirror 42 is a spherical mirror mounted on a PZT. In an alternative embodiment, illustrated in FIG. 4, a plane (planar) reference mirror is utilized. For either embodiment, it is desirable to match the radius of curvature of reference mirror 42 to the radius of curvature of the incident wavefronts of reference beam 31 so that reference beam 31 is reflected upon itself to form a point source at the center of aperture stop 50. This provides a convenient way to align the reference and object beams using a detector in place of aperture stop 50 so that spots formed by collimator 32 and reference mirror 42 coincide. Furthermore, the proper radius of curvature for reference mirror 42 matches the reference and object beams so that the combined beam has a generally planar wavefront at detector array 56.

Reference mirror 42 is positioned such that the optical path length of reference beam 44 differs from the optical path length of object beam 30. As used herein, the optical path lengths for the reference beam and object beam include the corresponding reflected beams and are measured at each of the selected wavelengths. Preferably, the optical path length of the object beam is greater than the optical path length of the reference beam. In one embodiment, the optical path length of the object beam is at least twice, and preferably several times greater than the optical path length of the reference beam. This allows illumination of relatively large objects without requiring a large path length for the reference beam so that overall size and complexity of the system can be reduced.

Reference beam 44 is reflected by beamsplitter 28 where it is combined with object beam 38. The combined beam passes through an aperture 52 of aperture stop element 50 toward imaging lens 56 which forms a discernible image of object 36 on detector array 58 which is preferably positioned at the image plane of the system. In a preferred embodiment, imaging lens 56 is a commercially available telescope eyepiece, such as the Celestron eyepiece available from Orion Tele Cen of Santa Cruz, Calif. The size of aperture 52 is determined based on the speckle size produced by the combined beam and the pixel size of the pixels forming detector array 58. Speckle is produced when diffuse objects are imaged through the system. The speckle size is equal to $2\lambda F/D$ where $\lambda$ is the wavelength of the light, F is the focal length of imaging lens 56 and D is the diameter of aperture 52. The speckle size is preferably between about ½ and 3 times the pixel size depending on the requirements of the particular application. The size of aperture 52 also controls the amount of light that passes from object 36 to detector array 58 when a diffuse object is imaged. In a preferred embodiment, aperture 52 is about 3 mm in diameter. The shape of aperture 52 may be adapted to block specific spurious reflections in the system.

Detector array 58 is preferably a two-dimensional array which responds to the intensity of the interference pattern generated by the object and reference beams. Detector array 58 is preferably a CCD (charge-coupled device) that includes an array of pixels. The array size may be hundreds of pixels by hundreds of pixels, or thousands of pixels by thousands of pixels depending upon the particular application. Each pixel is typically on the order of tens of microns by tens of microns. The output of detector array 58 is available for digitization either by electronics integral to the detector array package, or by an external frame grabber such as those available from BitFlow Corporation of Woburn, Mass. In a preferred embodiment, detector array 58 is a twelve-bit array of 1024×1024 pixels, i.e. each pixel may have any of $2^{12}$ values representing an incident intensity. Such detectors are commercially available from various suppliers including Dalsa Corporation of Waterloo, Ontario, Canada.

A computer 60, which implements control logic using various software and/or hardware, is coupled to tunable laser source 12, wavelength calibration device 16, reference mirror 42 (via a PZT), and detector array 58. Computer 60 should be selected based on the requirements of the particular application taking into account the required processing speed (which may determine the amount of RAM required in addition to the minimum CPU speed) and data storage. Computer 60 preferably includes an appropriate operator interface (not shown) which may include a keyboard, pointing device, display, printer, and the like. In a preferred embodiment of the present invention, computer 60 includes a 200 MHz processor with 256 MB of RAM and 3 GB of disk storage.

Figure 2:
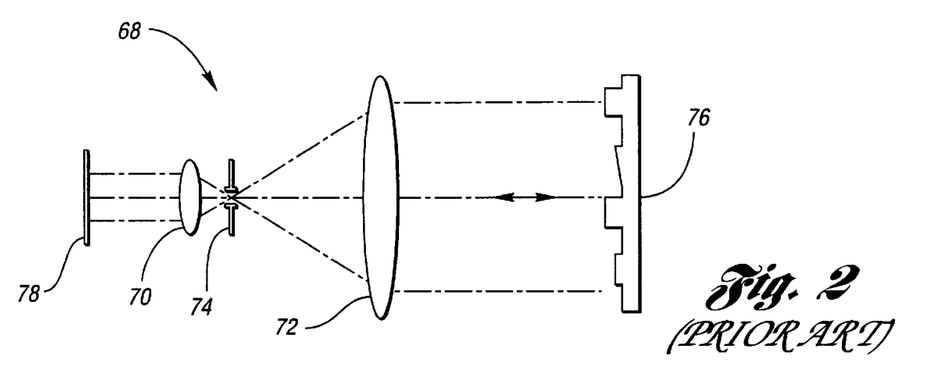
FIG. 2 is a schematic diagram illustrating a prior art refractive telecentric imaging system.

The present invention provides a telecentric imaging system for use in multiple wavelength interferometry of large objects. In developing the hybrid reflective/refractive telecentric imaging system of the present invention, a number of prior art imaging arrangements were considered and rejected. For example, a prior art refractive telecentric imaging system 68 is illustrated in FIG. 2. System 68 includes an imaging lens 70 and a collimating lens 72 with an aperture stop 74 positioned therebetween. For interferometry applications, a beam splitter would typically be placed between imaging lens 70 and collimating lens 72. An image of object 76 is formed at image plane 78. To image a large object 76, system 68 requires a large collimating lens 72. When incorporated into a system for multiple wavelength interferometry, such large refractive elements produce problematic reflections, wavelength dependent aberrations, and phase errors. As such, system 68 is not suitable for imaging large objects.

Figure 3:
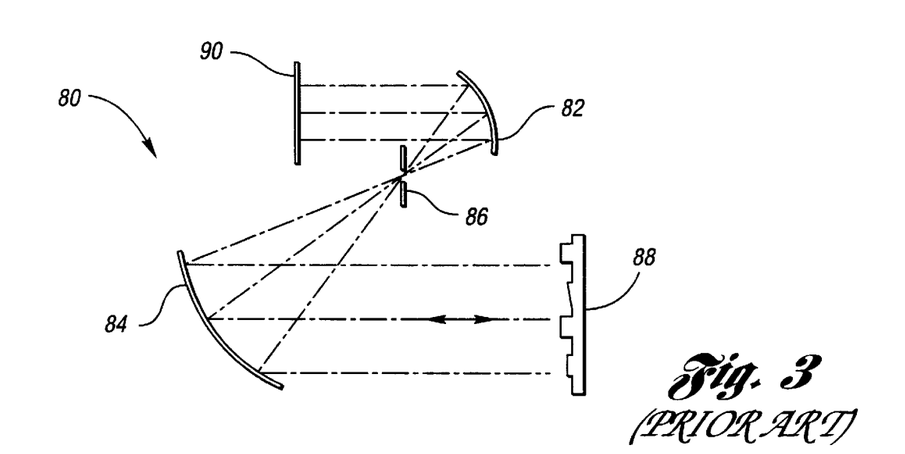
FIG. 3 is a schematic diagram illustrating a prior art reflective telecentric imaging system.

A prior art reflective telecentric imaging system 80 is illustrated in FIG. 3. System 80 includes off-axis parabolas 82 and 84 which respectively function as an imaging element and a collimating element in combination with an appropriately sized aperture stop 86. An image of object 88 is created at image plane 90. While this system provides perfect imaging at the center of the field-of-view, the imaging performance degrades rapidly off-axis. As such, system 80 is not suitable for use in a system for multiple wavelength interferometry of large objects.

Figure 4:
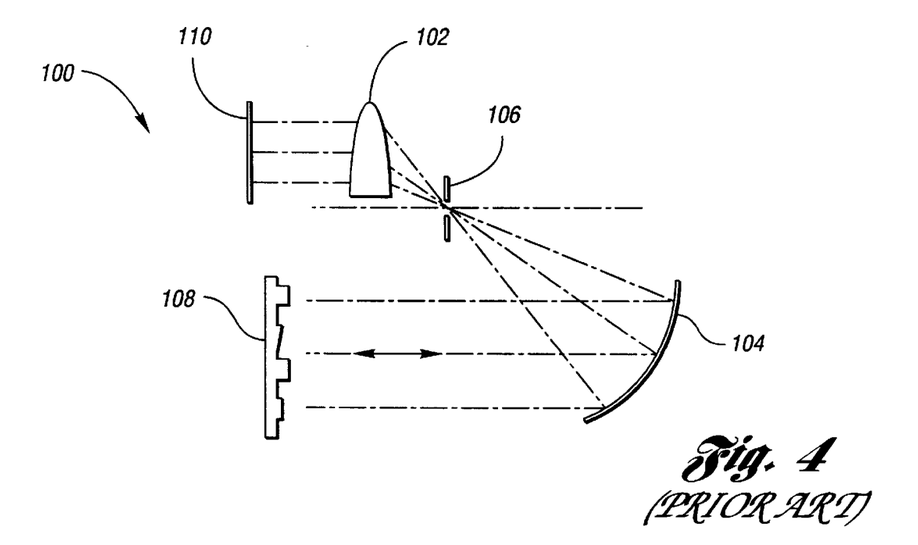
FIG. 4 is a schematic diagram illustrating a prior art hybrid refractive/reflective telecentric imaging system.

A prior art hybrid refractive/reflective telecentric imaging system 100 is illustrated in FIG. 4. System 100 includes a lens segment 102 in combination with an off-axis parabola 104 and an appropriately sized aperture stop 106. Lens segment 102 forms an image of object 108 at image plane 110. In this system, the axis 112 of lens segment 102 is aligned with the axis 114 of off-axis parabola 104. System 100 was rejected for use in multiple wavelength interferometry for large objects due to the difficulty in fabricating appropriately sized optics, including lens segment 102 and off-axis parabola 104.

Figure 5:
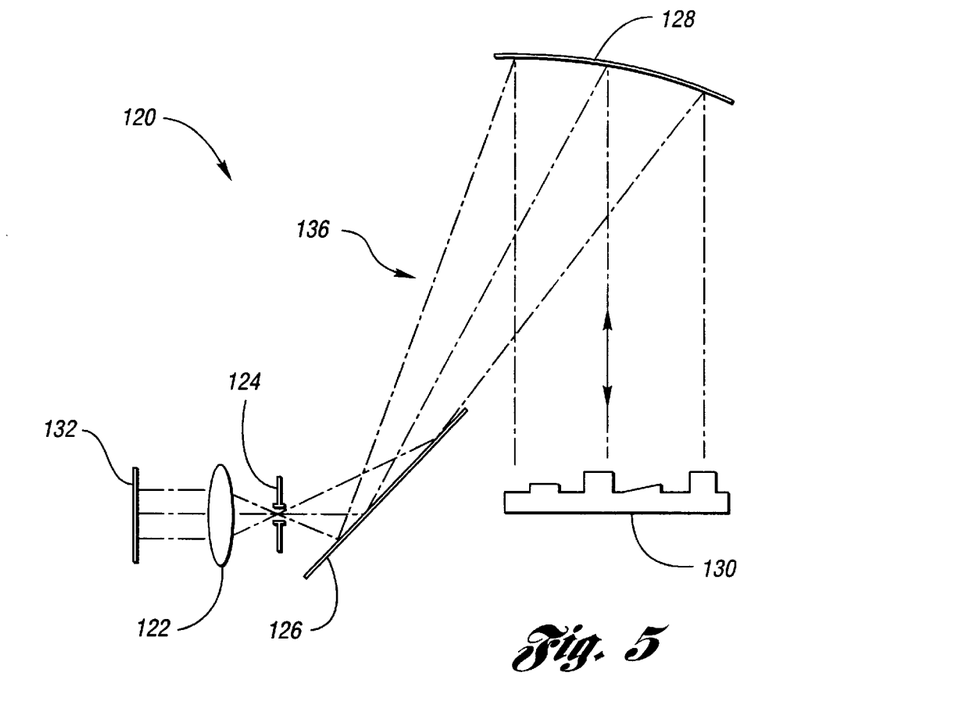
FIG. 5 is a schematic diagram illustrating a hybrid refractive/reflective telecentric imaging system for multiple wavelength interferometry of large objects according to the present invention.

FIG. 5 illustrates a hybrid reflective/refractive telecentric imaging system for use in multiple wavelength interferometry of large objects according to the present invention. System 120 includes an imaging lens 122, an aperture stop 124, a folding mirror 126, and an off-axis parabola 128. An image of object 130 is formed at image plane 132. System 120 uses both refractive and reflective optics while maintaining system telecentricity. The arrangement of the elements of system 120 facilitates imaging of large objects using elements which are commercially available. While the system may exhibit some non-ideal effects, including distortion and field dependent aberration, these effects can be compensated by appropriate positioning of elements in combination with appropriate data processing. Distortion can be corrected by spatially remapping the image while the field dependent aberration can be corrected with a field lens or by digital refocusing.

Figure 6:
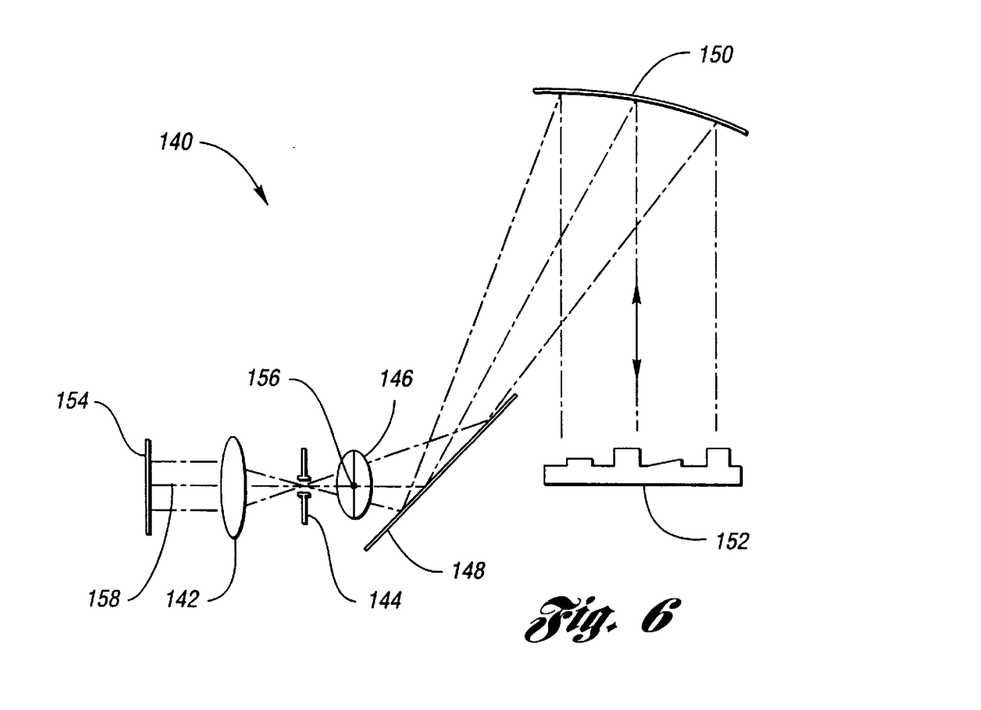
FIG. 6 is a side-view schematic diagram illustrating an embodiment using an off-axis parabolic collimator in a hybrid refractive/reflective telecentric imaging system according to the present invention.
Figure 7:
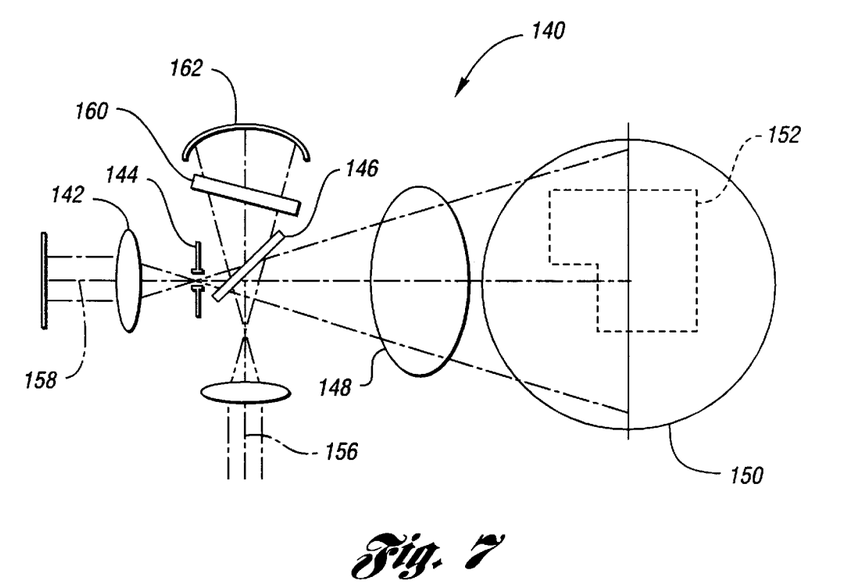
FIG. 7 is a top-view schematic diagram of the embodiment of FIG. 5.

FIGS. 6 and 7 are schematic diagrams illustrating a side view and top view, respectively, of a hybrid reflective/refractive telecentric imaging system in a multiple wavelength interferometer according to the present invention. System 140 includes an imaging lens 142, an aperture stop 144, a beam splitter 146, a folding mirror 148, and an off-axis parabola 150. An image of object 152 is formed at image plane 154. System 140 also includes an attenuator 160 and a reference mirror 162. As illustrated, off-axis parabola 150 is positioned above the plane of the reference beam axis 156 and the combined reference/object beam axis 158. In FIG. 6, axis 156 of the reference beam is perpendicular to the plane of the page. In FIG. 7, folding mirror 148 directs the object beam out of the page to off-axis parabola 150 which is above the plane of the page.

Figure 8:
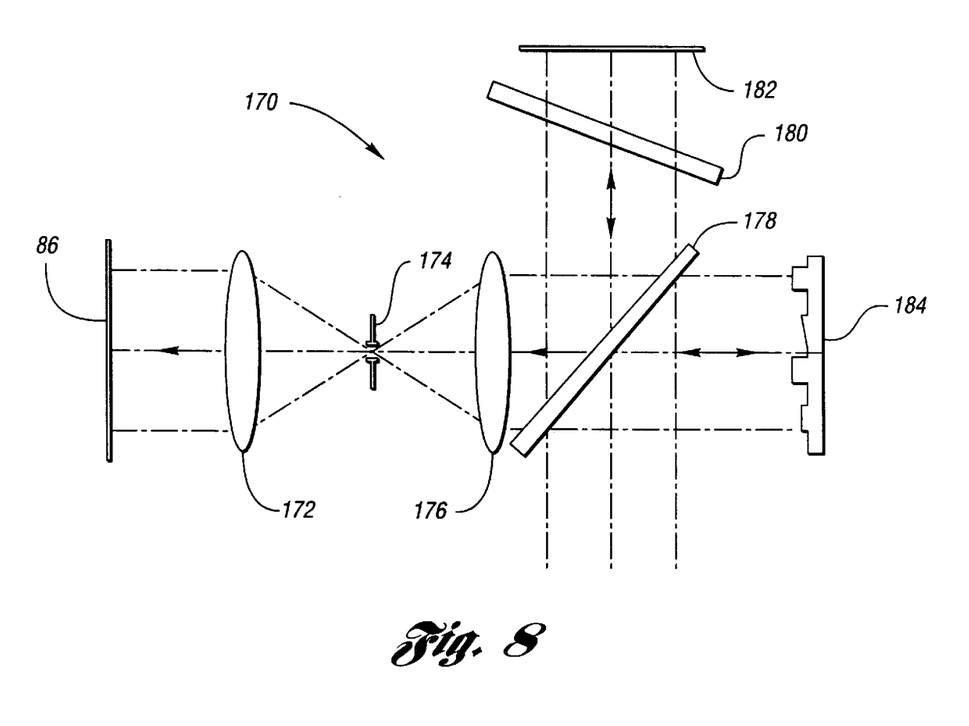
FIG. 8 is a schematic diagram of one embodiment of a refractive telecentric imaging system with an external beam splitter suitable for imaging small objects according to the present invention.

FIG. 8 illustrates another embodiment of the present invention which utilizes a refractive telecentric imaging system for multiple wavelength interferometry of relatively small objects. System 170 includes an imaging lens 172, aperture stop 174, collimating lens 176, beam splitter 178, attenuator 180, and reference mirror 182. An image of object 184 is formed at image plane 186. Beam splitter 178 is positioned outside of the telecentric system defined by imaging lens 172 aperture stop 176, and collimating lens 176. This arrangement provides a small telecentric lens system which would otherwise have to be tilted between 10°–15° creating problematic aberrations.

Calibration of the multiple wavelength inspection systems according to the present invention is accomplished using a flat, diffusely reflecting surface in the object space. Typically, a relatively flat metal plate is used where the flatness is directly related to the calibration performance. Readily available ground and polished steel plates are suitable, rather than an optically polished mirror which may be easily scratched or broken such as those required by other interferometric measurement systems. This is an attractive feature for a variety of industrial applications. During calibration, a flat plate is placed within the object space and range values are determined over the region(s) of interest. The range values obtained by imaging the flat plate are then subtracted from subsequently collected data sets. This compensates for system errors caused by non-ideal components or alignment, or slowly varying changes in the optical setup.

The present invention may be used to measure replicas of objects which can not be easily measured directly. For example, if surface height measurements of a translucent object are required, a replica of the object may be made using an appropriate casting compound. The replica is then used to provide the necessary range information. In addition, one or more surfaces of the replica may be treated to enhance reflectivity.

Figure 9:
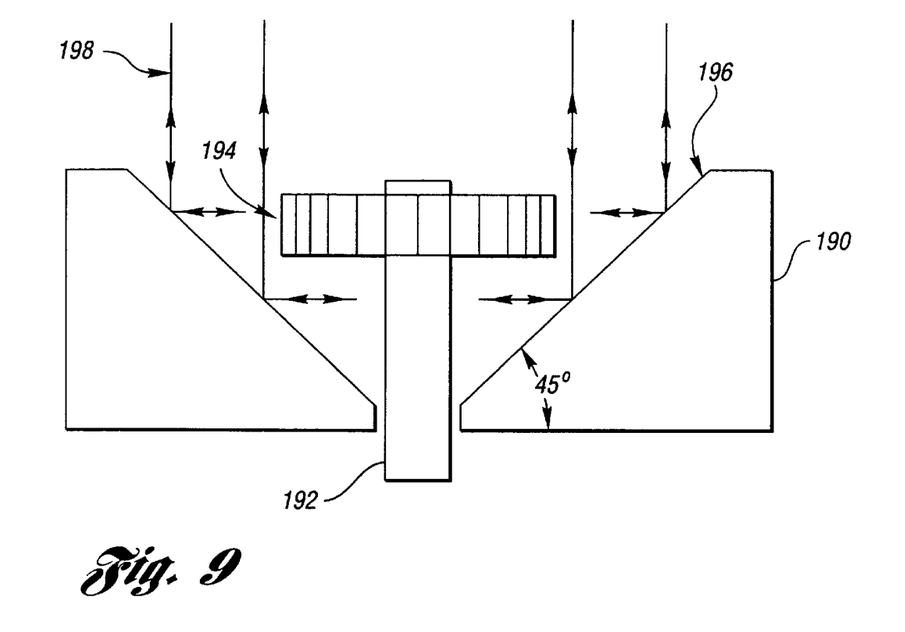
FIG. 9 is a side view of a reflector used for inspection of cylindraceous objects according to the present invention.
Figure 10:
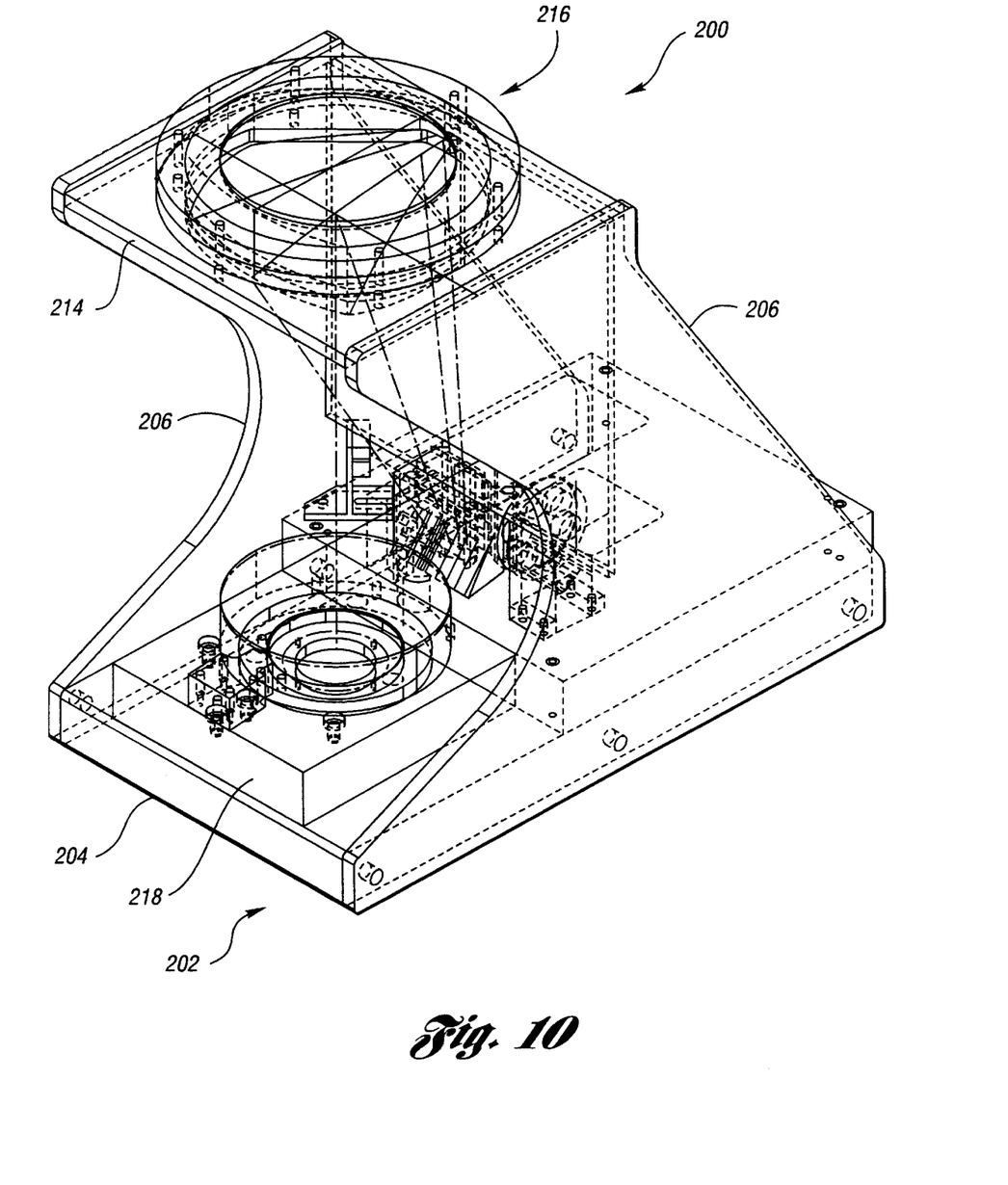
FIG. 10 is a perspective view of one embodiment of an inspection system for large objects using multiple wavelength image plane interferometry according to the present invention.
Figure 11:
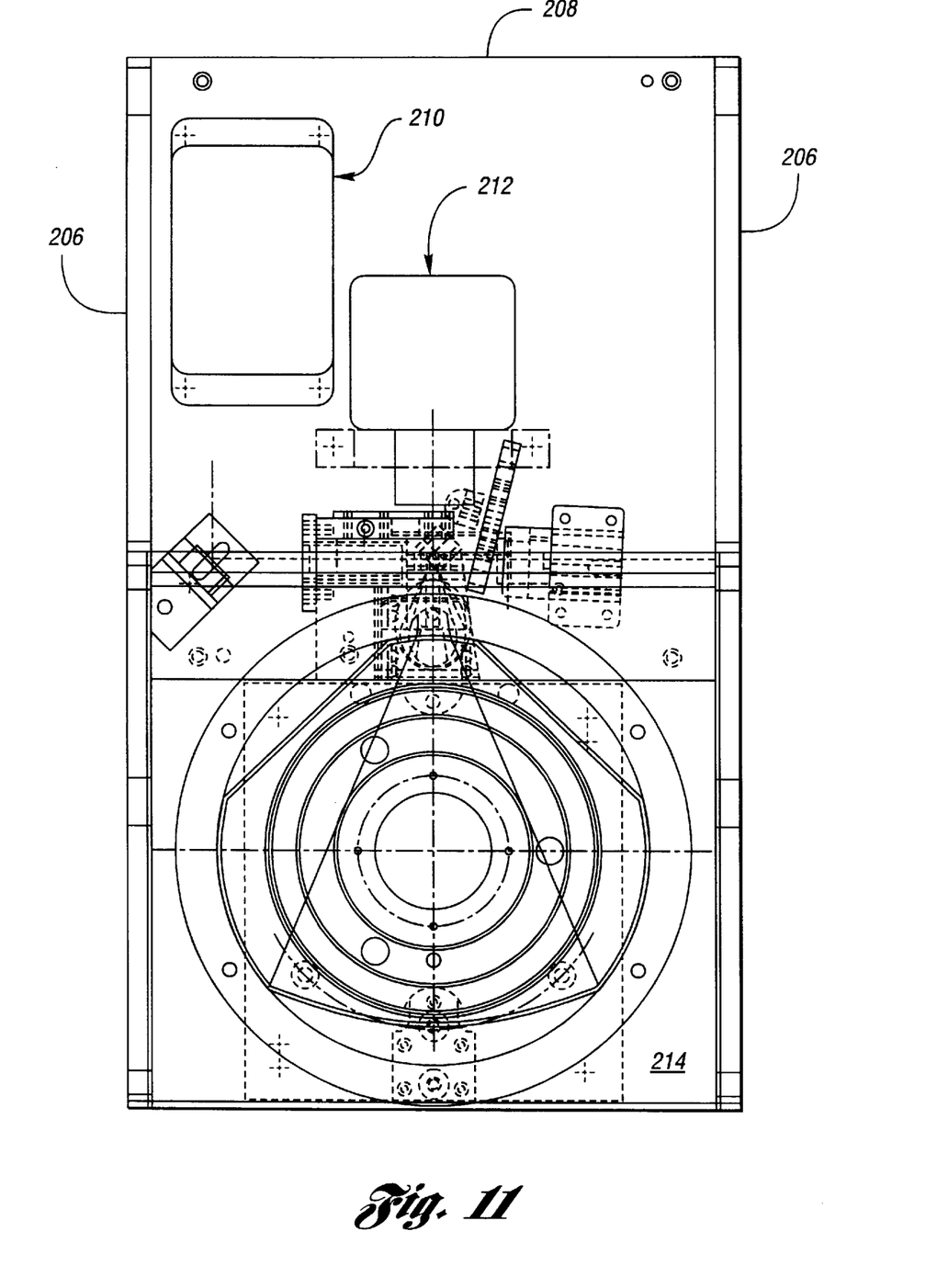
FIG. 11 is a top view of the embodiment of FIG. 10.
Figure 12:
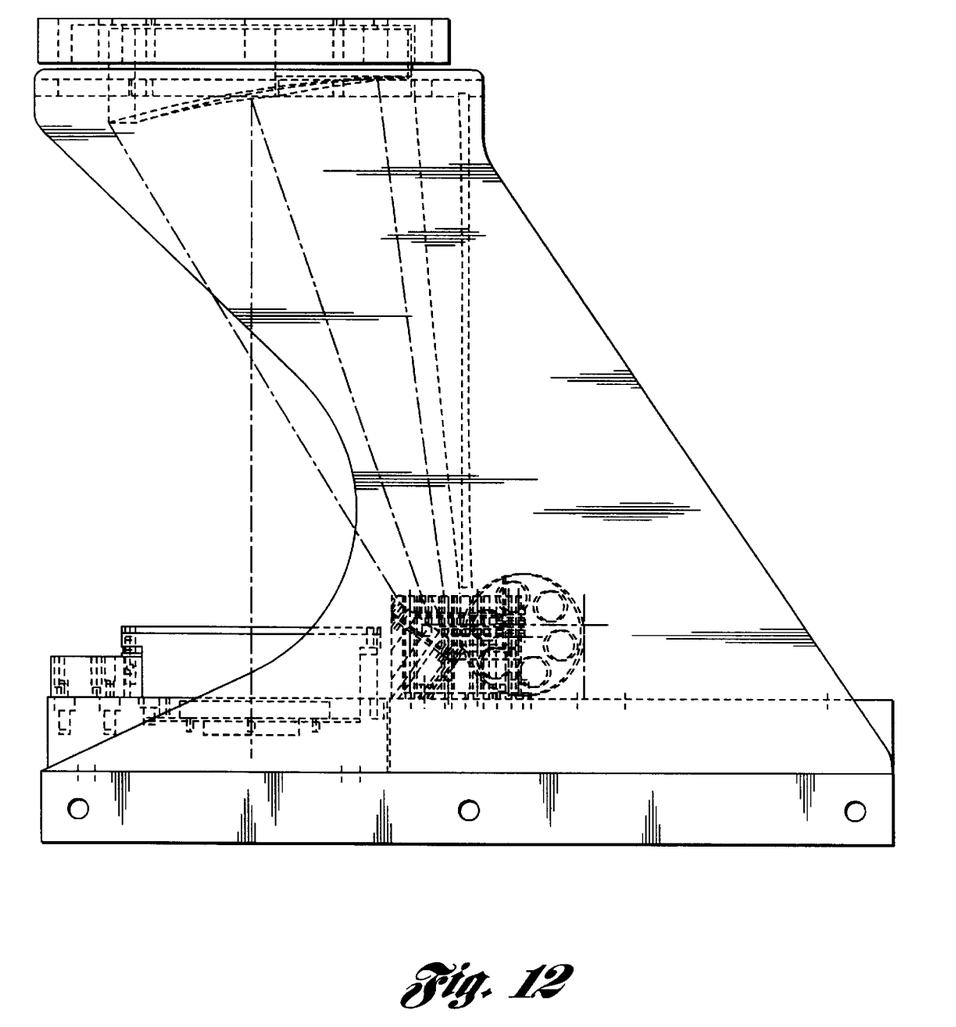
FIG. 12 is a side view of the embodiment of FIG. 10.
Figure 13:
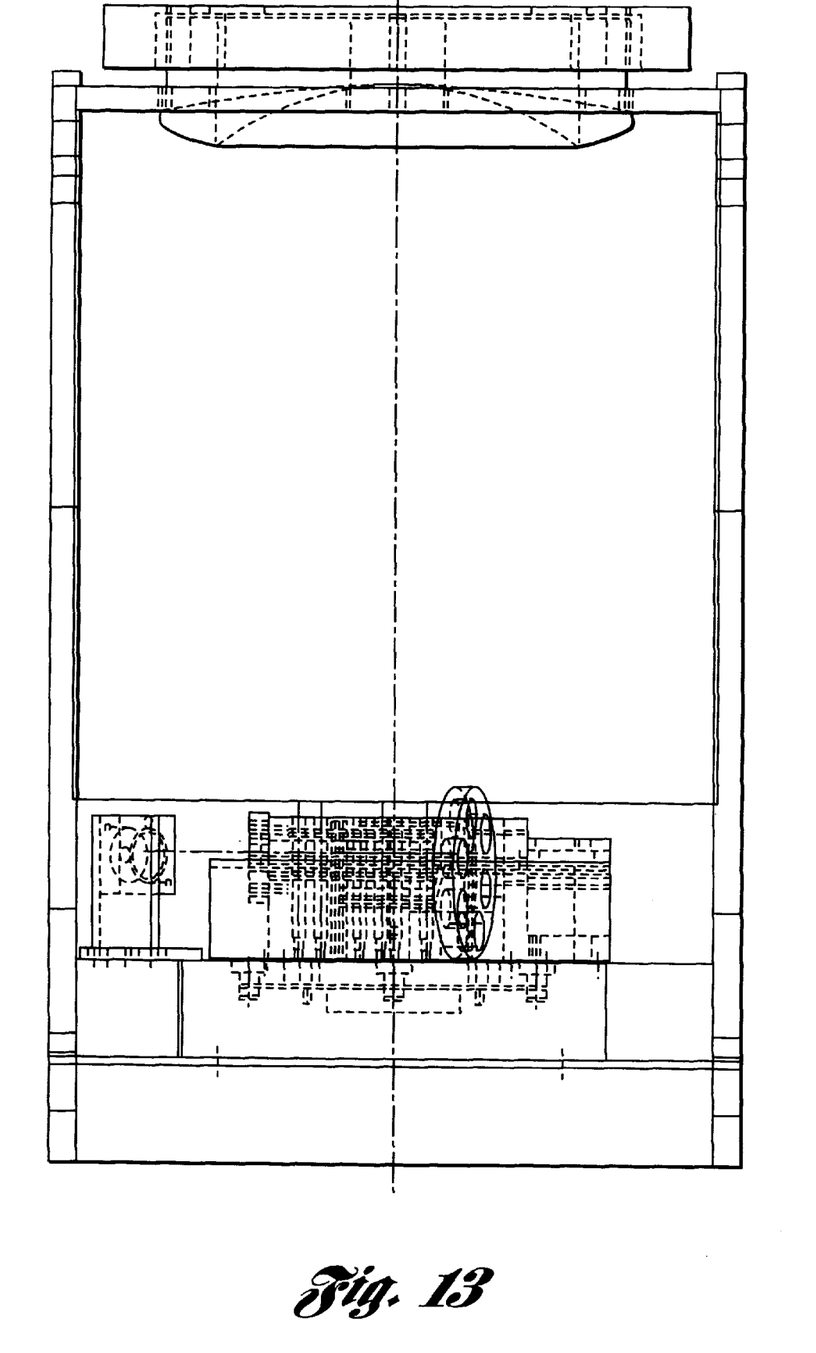
FIG. 13 is a front view of the embodiment of FIG. 10.

Due to the relatively large object space provided by the present invention, one or more mirrors or reflectors may be used to image otherwise occluded areas of an object. For example, a conical reflector, preferably a 45° cone, may be used to image the interior of a cylindraceous object. For cylindrical objects, the axis of the cylinder is preferably coincident with the axis of the cone. The object is placed into the system so that the incoming rays of the object beam are parallel to the axis of the cone and provide circumferential illumination. Exterior surfaces of cylindraceous objects may be imaged utilizing a reflector having an inverted frustoconical reflective surface, such as illustrated in FIG. 9. A reflector 190 provides circumferential illumination/imaging of lateral portions 194 of cylindraceous object 192. Reflector 190 has an inverted frustoconical reflective surface 196, preferably at a 45° angle relative to the axis of object beam 198, i.e. a cone angle of 90°. The resulting image is a polar representation of the three-dimensional deviation of object 192. The present invention is particularly suited for inspection of this general class of object because surface discontinuities and diffusely reflecting surfaces are readily imaged.

Figure 14:
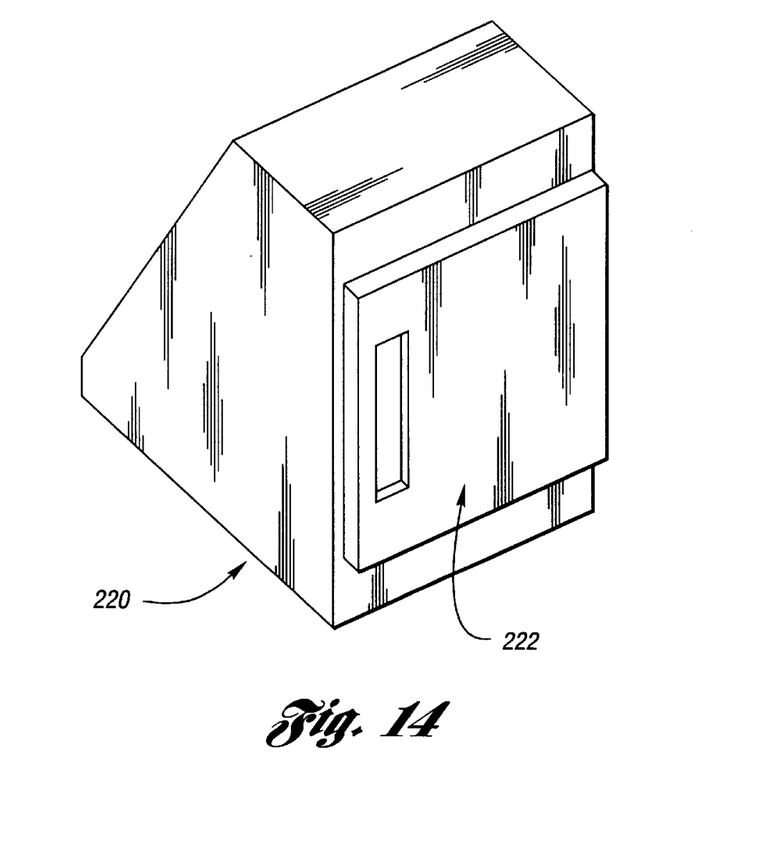
FIG. 14 is a perspective view of a housing or enclosure for an inspection system for large objects using multiple wavelength image plane interferometry according to the present invention.

FIGS. 10–13 illustrate a preferred embodiment of an inspection system according to the present invention which is preferably enclosed by a housing as illustrated in FIG. 14. System 200 includes a mounting fixture, indicated generally by reference numeral 202. Fixture 202 is preferably machined from aluminum and designed for rigid mounting of the various optical elements. In a preferred embodiment, system 200 is placed on a granite surface plate on an inspection stand which includes a shelf for holding various auxiliary equipment, such as power supplies, laser electronics, etc. Fixture 202 includes a base 204 secured to vertical risers 206. A plate 208 having holes 210 and 212 for placement of the diode laser and digital camera, respectively, is secured between risers 206 to the top of base 204. Plate 208 also contains various tapped holes for mounting optical components. An upper plate 214 is secured between upper portions of risers 206 and includes mounting hardware 216 which provides an adjustable mounting for an off-axis parabolic mirror. A fixturing block 218 is placed within the object space to hold the object during inspection. Of course, the particular fixturing is application specific and may vary.

FIG. 14 illustrates an enclosure or housing 220 which preferably surrounds the various optical elements to reduce optical noise during inspection. Housing 220 includes an access panel 222 for providing access to the object space during placement of the object.

The present invention is readily scalable and may be used to image large objects as compared to traditional laser interferometry systems and methods. For example, in a preferred embodiment, system 10 includes a cubic object space of about 7 inches (17.8 cm) per side. In comparison, methods based on white light illumination are typically embodied as microscopes with small fields-of-view on the order of ½ inch (1.25 cm). Large depths are accommodated without drastic defocus because the imaging systems according to the present invention have high f-numbers (f/#). Furthermore, algorithmic refocusing can be performed. Steps in depth which result in discontinuities in the fringe pattern, can be measured because the present invention does not rely on spatial fringe unwrapping for image formation. Furthermore, the object is illuminated and viewed from the same direction so that shadowing from steps in depth (range) is eliminated.

While the best modes contemplated for carrying out the invention have been described in detail, those familiar with the art to which this invention relates will recognize various alternative designs and embodiments for practicing the invention as defined by the following claims.

What is claimed is:

1. A system for interferometric inspection of an object, the system comprising:

a tunable laser source for providing a coherent energy beam having a selectable variable wavelength;

a beam splitter for separating the energy beam into a reference beam and an object beam, directing the object beam toward the object for illumination thereof, combining energy reflected from the object and a reflected reference beam to form an image beam, and directing the image beam toward a detector;

a reference mirror for reflecting the reference beam back toward the beam splitter to generate the reflected reference beam, the mirror being positioned generally perpendicular to wavefronts of the reference beam and having an adjustable position in response to a command signal to vary phase of the reflected reference beam, the mirror being positioned such that optical path length of the reference beam differs from optical path length of the object beam;

an attenuator positioned between the reference mirror and the beam splitter at a nonperpendicular angle relative to the reference beam to reduce spurious reflections while attenuating the reference beam;

an aperture stop element having an aperture for controlling speckle size;

an optical element for focussing energy reflected from the object to a point within the aperture;

an imaging lens for focussing the image beam on the detector; and a computer in communication with the tunable laser source, the reference mirror, and the detector, the computer determining range values for a plurality of points on the object.

2. The system of claim 1 wherein the tunable laser source comprises a tunable diode laser.

3. The system of claim 1 wherein the tunable laser source comprises a plurality of monochromatic lasers.

4. The system of claim 1 further comprising:

a wavelength calibration device for determining wavelength of the tunable laser source for each selected wavelength.

5. The system of claim 4 wherein the wavelength calibration device comprises an etalon having transmission peaks corresponding to selected wavelengths for the tunable laser source.

6. The system of claim 4 wherein the wavelength calibration device comprises a wavemeter in communication with the computer, the computer using information from the wavemeter to determine the range values.

7. The system of claim 4 wherein the wavelength calibration device comprises at least one cell having predetermined transmission peaks.

8. The system of claim 1 wherein the optical element comprises a reflective collimator to facilitate inspection of large objects while reducing spurious reflections.

9. The system of claim 1 wherein the optical element comprises a concave mirror.

10. The system of claim 9 wherein the optical element comprises an off-axis parabolic mirror.

11. The system of claim 1 wherein the reference mirror comprises a spherical mirror having a radius of curvature which matches radius of curvature of reference beam wavefronts.

12. The system of claim 1 wherein the optical element comprises a second lens.

13. The system of claim 12 wherein the aperture is positioned between the imaging lens and the second lens.

14. The system of claim 13 wherein the beam splitter is positioned between the object and the second lens to reduce spurious reflections.

15. The system of claim 12 wherein the reference mirror comprises a planar mirror.

16. The system of claim 1 wherein the beam splitter comprises a wedge-shaped beam splitter having a first surface for separating the energy beam into the object beam and the reference beam and a second surface oriented at an angle relative to the first surface wherein the angle is selected such that spurious reflections are blocked by the aperture stop element.

17. The system of claim 16 wherein the second surface of the beam splitter is coated with an anti-reflective material.

18. The system of claim 16 wherein the beam splitter is positioned at a first angle and the attenuator is positioned at a second angle relative to the reference beam wherein the first and second angles have opposite directions relative to a plane perpendicular to propagation direction of the reference beam to reduce spherical aberration.

19. The system of claim 1 wherein the attenuator comprises a neutral density absorptive glass filter.

20. The system of claim 1 further comprising:
   an off-axis parabolic mirror positioned between the tunable laser source and the beam splitter for directing and focussing the energy beam to a point between the parabolic mirror and the beam splitter.

21. The system of claim 1 wherein the optical element comprises an off-axis parabolic mirror positioned above a reference plane defined by axes of the energy beam, the reference beam, and the combined reference and object beam, the system further comprising:
   a plane mirror interposed the beam splitter and the parabolic mirror for redirecting the object beam toward the parabolic mirror to illuminate the object.

22. The system of claim 1 wherein the optical path length of the object beam exceeds the optical path length of the reference beam.

23. The system of claim 1 wherein the optical path length of the object beam is at least twice the optical path length of the reference beam.

24. The system of claim 1 further comprising:
   a reflector for obtaining measurements from cylindraceous objects, the reflector having an inverted frusto-conical reflective interior surface for circumferentially illuminating the object.

25. The system of claim 1 further comprising:
   a reflector having a conical reflective exterior surface for imaging a cylindrical interior portion of the object.

26. The system of claim 25 wherein the reflector comprises a 45° cone.

27. The system of claim 1 further comprising:
   at least one planar mirror positioned to illuminate otherwise occluded portions of the object.

28. The system of claim 1 further comprising:
   a focussing lens interposed the tunable laser source and the beam splitter for focussing the energy beam to a point between the focussing lens and the beam splitter; and
   a planar mirror interposed the tunable laser source and the focussing lens for redirecting the energy beam toward the focussing lens and the beam splitter.

29. A multiple wavelength image plane interferometric inspection system for inspecting objects placed in an object space, the system comprising:
   a tunable diode laser for providing a coherent energy beam at multiple selectable wavelengths;
   a first lens for focussing the energy beam to form a first point source;
   a beam splitter for separating the energy beam into an object beam and a reference beam, the beam splitter including at least one surface having an anti-reflective coating thereon;
   an attenuator positioned at an angle relative to a propagation axis of the reference beam to reduce spurious reflections;
   a spherical reference mirror for reflecting the reference beam from the attenuator back toward the beam splitter, the reference mirror having a radius of curvature which matches a radius of curvature of the reference beam, the reference mirror being translatable along the propagation axis of the reference beam to provide a selectable phase shift in the reference beam;
   a collimator interposed the beam splitter and the object space for collimating the object beam such that the object beam has substantially planar wavefronts, the collimator focussing energy reflected from the object space to a second point source on an opposite side of the beam splitter;
   an aperture stop having an aperture positioned at the second point source for reducing aberration;
   a detector array for detecting an interference pattern produced by a combination of the reference beam with the object beam;
   an imaging lens interposed the aperture stop and the detector array for forming an image of the interference pattern on the detector array; and
   control logic in communication with the tunable laser source, the reference mirror, and the detector array, the control logic operative to control selection of a series of wavelengths for the tunable laser source and generate, commands to position the reference mirror to induce a plurality of phase shifts in the reference beam with each phase shift based on a corresponding selected wavelength, the control logic further operative to process signals generated by the detector array to generate range information for points on an object.

30. The system of claim 29 wherein the collimator comprises an off-axis parabolic mirror.

31. The system of claim 29 wherein the system further comprises:
   a housing surrounding the laser source, the first lens, the beam splitter, the attenuator, the reference mirror, the collimator, the imaging lens, the detector array, and the aperture stop for reducing optical noise during inspection, the housing including an access panel for providing access to the object space.

32. The system of claim 29 wherein the attenuator comprises a neutral density absorptive glass filter, the attenuator being positioned at an angle relative to a propagation axis of the reference beam to reduce spurious reflections, the angle being opposite an angle formed by the wedge-shaped beam splitter to reduce spherical aberration.

33. The system of claim 29 further comprising:

a beam conditioner interposed the diode laser and the first lens for providing anamorphic correction of the energy beam to reduce asymmetry thereof.

34. The system of claim 29 further comprising:

a wavelength calibration device interposed the diode laser and the first lens, the calibration device having significantly greater transmissivity for selected wavelengths of the diode laser relative to all other wavelengths to reduce uncertainty in determining the selected wavelengths.

35. The system of claim 34 wherein the wavelength calibration device comprises an etalon having transmission peaks corresponding to the selected wavelengths for the diode laser.

36. The system of claim 29 further comprising a wavelength calibration device including at least one cell containing a substance having a significantly higher transmissivity for at least one narrow band of wavelengths relative to other wavelengths.

37. The system of claim 29 further comprising:

at least one mirror disposed within the object space for imaging lateral portions of an object.

38. The system of claim 37 wherein the mirror comprises:

an inverted frustoconical reflective surface for circumferentially imaging an object within the object space.

39. The system of claim 29 further comprising:

a flat diffusely reflective calibration plate for positioning within the object space to determine compensating range values for subtracting from subsequently collected data sets to compensate for system errors.

40. The system of claim 29 wherein the control logic determines compensating range values based for a diffusely reflective calibration plate and subtracts the compensating range values from subsequently collected data sets to compensate for system errors.

* * * * *